LEWIS L. WHITLOCK.
Improvement in Machines for Lifting Drop Weights.

No. 118,316. Patented Aug. 22, 1871.

WITNESSES:
Parker H. Sweet, Jr.
W. G. Henderson

INVENTOR:
Lewis L. Whitlock

UNITED STATES PATENT OFFICE.

LEWIS L. WHITLOCK, OF NEW YORK, N. Y.

IMPROVEMENT IN MACHINES FOR LIFTING DROP-WEIGHTS.

Specification forming part of Letters Patent No. 118,316, dated August 22, 1871.

*To all whom it may concern:*

Be it known that I, LEWIS L. WHITLOCK, of the city, county, and State of New York, have invented certain Improvements in Lifting-Machines for Raising Weights, such as drop and trip-hammers, rock-drills, pile-drivers, ore-stampers, &c.

My invention relates, in part, to the use of a cam-wheel which begins to lift at the periphery and lets go at the center. In the periphery of this wheel are one or more V-grooves, into which a V-grooved pinion-wheel fits. Said pinion is fastened to the shaft by a feather, which allows it to adjust itself to the cam-wheel. There is also a balance-wheel and pulley on this shaft, which run in a movable box, so as to allow the pinion to be thrown into or out of gear at will of the operator. I catch the weight as it rebounds, and take it up to any desired point and hold it automatically.

Figure 1:
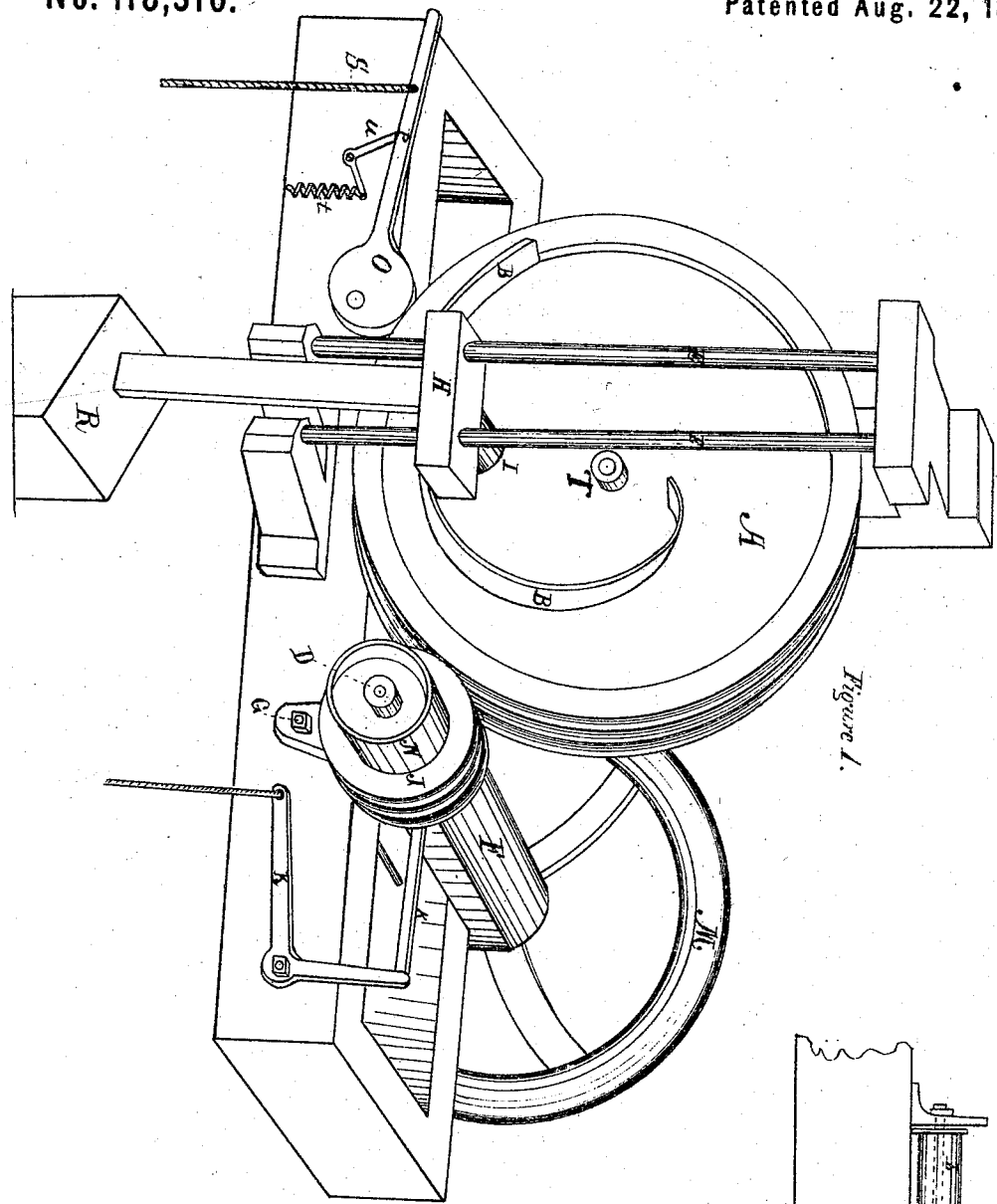
Figure 2:
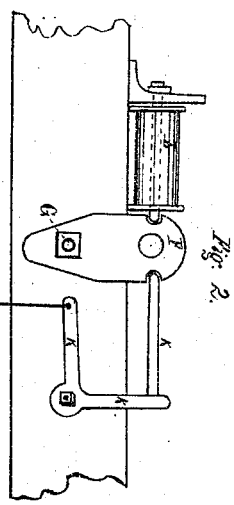

A is a cam-wheel with a V friction-groove or grooves in its periphery. B is the cam, which commences to raise the weight at the periphery and lets go at the center. I is a friction-roller which runs on the inside of the cam B. It is attached to a head-block, H, which slides on the guide-rods E E. It will be seen that these guide-rods are one side of the center of the wheel A, the object being to have the friction-roller I in such a position that where it rests on the cam there will be no side motion against the guides E E, and consequently little friction. The shaft D runs in a movable box or bearing, F, which rocks on the bolt G. On this shaft is a pinion-wheel, J, with V-grooves, which fit those of the cam-wheel A. The pinion-wheel J is thrown in contact with the cam-wheel A by the lever K, to which a treadle is attached. The pinion-wheel J is thrown out of contact with the cam-wheel A by a heavy rubber spring, L, as seen in Fig. 2, whenever the weight is taken off from the lever K.

As these machines are only lifting the weight a limited part of each minute, a balance-wheel, M, is fastened to the shaft D for the purpose of storing power which would otherwise be lost. This shaft is run at high speed by the belt on the pulley N, therefore requiring less constant power.

In order to hold the weight at any desired place I have attached a brake, O, which works automatically. It consists of an eccentric or wheel hung one side of its center with a lever or arm, P, fastened to it. To this lever is attached a spring, $t$, and lever, $u$, to keep it in contact with the wheel A. In this brake O are V-grooves to match those in the wheel A. This break is applicable to many other kinds of machines.

To work this machine, the operator places his foot upon the treadle, which throws the pinion-wheel J in contact with the cam-wheel A, the amount of friction so produced between these wheels deciding the speed with which the cam-wheel A moves, and consequently the speed at which the weight R is raised. If he desires to strike the blow, he keeps his foot upon the treadle until the roller I has fallen from the inside end of the cam B and until the outside end has passed under it, which will occur before the weight has had time to strike the second blow from the rebound, thus lifting the weight out of the way of the operator as well as catching the rebound.

It will be seen by reference to the drawing that at the moment the pinion-wheel J is withdrawn from the cam-wheel A the weight tends to turn the wheel A in the opposite direction. At this moment—when the wheel A begins to turn back—the brake comes in close contact with the wheel A and holds it perfectly safe at that point.

It will be noticed that the brake O does not impede the revolution of the wheel A while the weight is being raised.

In adjusting dies or striking light blows the brake may be fastened out of contact with the wheel by the cord S, and the weight may then be raised to any desired height and allowed to run back on the cam B, giving as light a blow as desired and being perfectly under the control of the operator.

I claim as my invention—

1. The combination and arrangement relative to one another, substantially as herein described, of the cam-shaft T, cam B, friction-roller I, and the bar or other device to which said friction-roller and the drop or weight to be lifted are connected.

2. In combination with the cam-shaft T, cam B, and friction-roller I, arranged relative to one another, as described, the cross-head H and the guide-rods E.

3. In combination with the cam-shaft T, cam B, and friction-roller I, arranged relative to one another, as described, the V-grooved gear-wheel A and driving gear-wheel J, the shaft D, and the movable journal-bearings F.

4. The combination with the V-grooved friction-gearing A and J of the V-grooved and eccentrically-pivoted frictional brake O.

5. The combination of the eccentrically-pivoted break O with its arm P, the spring $t$ or its equivalent, the lever $u$, and cord S, substantially as and for the purpose set forth.

6. The combination of the cam-wheel A with cross-head H, guide-rods E, roller I, and brake O with the rocker-shaft D, V-pinion J, pulley N, and balance-wheel M with spring L and lever K, or their equivalents, operating substantially as described.

LEWIS L. WHITLOCK.

Witnesses:
   W. G. HENDERSON,
   M. M. LEGGETT.